US012047628B2

(12) United States Patent
Szarek et al.

(10) Patent No.: US 12,047,628 B2
(45) Date of Patent: *Jul. 23, 2024

(54) SYSTEM AND METHOD OF HIGH-RESOLUTION DIGITAL DATA IMAGE TRANSMISSION

(71) Applicant: AeroVironment, Inc., Monrovia, CA (US)

(72) Inventors: Thomas Szarek, Simi Valley, CA (US); Thomas Omer, Moorpark, CA (US); Jefferson C. Mcbride, Simi Valley, CA (US)

(73) Assignee: AEROVIRONMENT, INC., Monrovia, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/204,904

(22) Filed: Jun. 1, 2023

(65) Prior Publication Data

US 2023/0396827 A1    Dec. 7, 2023

Related U.S. Application Data

(63) Continuation of application No. 17/957,212, filed on Sep. 30, 2022, now Pat. No. 11,700,408, which is a (Continued)

(51) Int. Cl.
*H04N 7/18* (2006.01)
*H04N 21/2187* (2011.01)
(Continued)

(52) U.S. Cl.
CPC ......... *H04N 21/2743* (2013.01); *H04N 7/185* (2013.01); *H04N 21/2187* (2013.01);
(Continued)

(58) Field of Classification Search
USPC ....................................................... 348/144
See application file for complete search history.

(56) References Cited

U.S. PATENT DOCUMENTS

| 3,638,502 A | 2/1972 | Leavitt et al. |
| 4,217,606 A | 8/1980 | Nordmann |

(Continued)

FOREIGN PATENT DOCUMENTS

| CN | 201099352 Y | 8/2008 |
| CN | 101766049 A | 6/2010 |

(Continued)

OTHER PUBLICATIONS

Notice of Corrected Notice of Allowability for U.S. Appl. No. 15/010,445, mailed Dec. 11, 2020, 6 pages.

(Continued)

*Primary Examiner* — Nigar Chowdhury
(74) *Attorney, Agent, or Firm* — NIXON PEABODY LLP; Jeffrey L. Costellia

(57) ABSTRACT

A system and method for transmitting still images and a video feed from an unmanned aerial vehicle to a ground station is disclosed. The system includes an aircraft including a digital video camera to capture still images and video frames of an object. A video encoder is coupled to the camera to provide a video output including video packets. A file server is coupled to the camera to provide a still image output including image data packets. A multiplexer is coupled to the video output and the still image output. The multiplexer produces a data transmission including the video packets and the image data packets. A transmitter sends the data transmission to the ground station. The ground station receives the data transmission and demultiplexes the packets into separate video and image data packets. The ground control station may select the ratio the video stream images (Continued)

in relation to the still image to be transmitted from the aircraft.

20 Claims, 5 Drawing Sheets

Related U.S. Application Data continuation of application No. 17/194,028, filed on Mar. 5, 2021, now Pat. No. 11,463,760, which is a continuation of application No. 15/010,445, filed on Jan. 29, 2016, now Pat. No. 10,945,017, which is a continuation of application No. 13/220,197, filed on Aug. 29, 2011, now Pat. No. 9,288,513.

(51) Int. Cl.
H04N 21/236     (2011.01)
H04N 21/2743    (2011.01)
H04N 21/414     (2011.01)
H04N 21/4223    (2011.01)
H04N 21/434     (2011.01)
H04N 21/81      (2011.01)
H04N 23/60      (2023.01)
H04N 23/661     (2023.01)

(52) U.S. Cl.
CPC . *H04N 21/23611* (2013.01); *H04N 21/23614* (2013.01); *H04N 21/41422* (2013.01); *H04N 21/4223* (2013.01); *H04N 21/4348* (2013.01); *H04N 21/8153* (2013.01); *H04N 23/60* (2023.01); *H04N 23/661* (2023.01)

(56) References Cited

U.S. PATENT DOCUMENTS

| | | |
|---|---|---|
| 4,819,059 A | 4/1989 | Pape |
| 4,855,823 A | 8/1989 | Struhs et al. |
| 5,153,623 A | 10/1992 | Bouvier |
| 5,251,118 A | 10/1993 | Budnovitch et al. |
| 5,383,645 A | 1/1995 | Pedut et al. |
| 5,424,854 A | 6/1995 | Hashimoto |
| 5,448,568 A | 9/1995 | Delpuch et al. |
| 5,537,446 A | 7/1996 | Lakshman et al. |
| 5,897,223 A | 4/1999 | Tritchew et al. |
| 5,936,245 A | 8/1999 | Goillot et al. |
| 6,056,237 A | 5/2000 | Woodland |
| 6,147,701 A | 11/2000 | Tamura et al. |
| 6,226,125 B1 | 5/2001 | Levy et al. |
| 6,269,078 B1 | 7/2001 | Lakshman et al. |
| D452,697 S | 1/2002 | Fallowfield et al. |
| 6,349,898 B1 | 2/2002 | Leonard et al. |
| 6,366,311 B1 | 4/2002 | Monroe |
| 6,529,620 B2 | 3/2003 | Thompson |
| 6,628,338 B1 | 9/2003 | Elberbaum et al. |
| 6,731,331 B1 | 5/2004 | Watabe et al. |
| 7,000,883 B2 | 2/2006 | Mercadal et al. |
| 7,049,953 B2 | 5/2006 | Monroe |
| 7,058,721 B1 | 6/2006 | Ellison et al. |
| 7,131,136 B2 | 10/2006 | Monroe |
| 7,173,526 B1 | 2/2007 | Monroe |
| 7,253,398 B2 | 8/2007 | Hughes et al. |
| 7,280,810 B2 | 10/2007 | Feher |
| 7,302,323 B2 | 11/2007 | Anderson et al. |
| 7,359,622 B2 | 4/2008 | Monroe et al. |
| 7,400,348 B2 | 7/2008 | Hoyos |
| 7,526,183 B2 | 4/2009 | Takahashi et al. |
| 7,561,037 B1 | 7/2009 | Monroe |
| 7,610,841 B2 | 11/2009 | Padan |
| 7,634,662 B2 | 12/2009 | Monroe |
| 7,695,647 B2 | 4/2010 | Smela et al. |
| 7,747,364 B2 | 6/2010 | Roy et al. |
| 7,955,006 B1 | 6/2011 | Harvey |
| 8,014,264 B2 | 9/2011 | Li et al. |
| 8,091,833 B2 | 1/2012 | von Flotow et al. |
| 8,137,007 B1 | 3/2012 | Harvey |
| 8,140,200 B2 | 3/2012 | Heppe et al. |
| 8,174,612 B1 | 5/2012 | Koehler |
| D662,120 S | 6/2012 | Deurwaarder |
| 8,226,039 B2 | 7/2012 | von Flotow et al. |
| D668,701 S | 10/2012 | Ohno et al. |
| 8,341,684 B2 | 12/2012 | Wei |
| 8,523,462 B2 | 9/2013 | Dimotakis |
| 8,559,801 B2 | 10/2013 | Dimotakis |
| 8,589,994 B2 | 11/2013 | Monroe |
| 8,767,041 B2 | 7/2014 | Yun et al. |
| 8,891,539 B2 | 11/2014 | Ozawa |
| 9,985,717 B2 | 5/2018 | Alcorn |
| 10,945,017 B2* | 3/2021 | Szarek ............ H04N 21/41422 |
| 2001/0043751 A1 | 11/2001 | Takahashi et al. |
| 2003/0067542 A1 | 4/2003 | Monroe |
| 2003/0099457 A1 | 5/2003 | Takahashi et al. |
| 2004/0026573 A1 | 2/2004 | Andersson et al. |
| 2004/0068583 A1 | 4/2004 | Monroe et al. |
| 2004/0173726 A1 | 9/2004 | Mercadal et al. |
| 2004/0230352 A1 | 11/2004 | Monroe |
| 2005/0044112 A1 | 2/2005 | Yamamoto et al. |
| 2005/0204910 A1 | 9/2005 | Padan |
| 2005/0219639 A1 | 10/2005 | Fujise et al. |
| 2006/0033288 A1 | 2/2006 | Hughes et al. |
| 2006/0110155 A1 | 5/2006 | Kouchi et al. |
| 2006/0129727 A1 | 6/2006 | Park |
| 2006/0231675 A1 | 10/2006 | Bostan |
| 2006/0276942 A1 | 12/2006 | Anderson et al. |
| 2006/0276943 A1 | 12/2006 | Anderson et al. |
| 2007/0031151 A1 | 2/2007 | Cunningham et al. |
| 2007/0042774 A1 | 2/2007 | Alcorn |
| 2008/0204553 A1 | 8/2008 | Thompson |
| 2008/0205696 A1 | 8/2008 | Thompson |
| 2008/0215204 A1 | 9/2008 | Roy et al. |
| 2008/0267612 A1 | 10/2008 | Harvey |
| 2008/0277631 A1 | 11/2008 | Smela et al. |
| 2008/0316313 A1 | 12/2008 | Monroe et al. |
| 2009/0015674 A1 | 1/2009 | Alley et al. |
| 2009/0216394 A1 | 8/2009 | Heppe et al. |
| 2009/0218447 A1 | 9/2009 | von Flotow et al. |
| 2009/0273671 A1 | 11/2009 | Gardner |
| 2009/0279490 A1 | 11/2009 | Alcorn |
| 2009/0284644 A1 | 11/2009 | McKaughan et al. |
| 2010/0013628 A1 | 1/2010 | Monroe |
| 2010/0034219 A1* | 2/2010 | Stadelmeier ........ H04L 25/0226 |
| | | 370/478 |
| 2010/0110162 A1 | 5/2010 | Yun et al. |
| 2010/0141503 A1 | 6/2010 | Baumatz |
| 2010/0241931 A1 | 9/2010 | Choi et al. |
| 2010/0265329 A1 | 10/2010 | Doneker |
| 2010/0309344 A1 | 12/2010 | Zimmer et al. |
| 2011/0103021 A1 | 5/2011 | Janssen et al. |
| 2011/0154427 A1 | 6/2011 | Wei |
| 2011/0170556 A1 | 7/2011 | Ozawa |
| 2012/0104169 A1 | 5/2012 | von Flotow et al. |
| 2012/0106800 A1 | 5/2012 | Khan et al. |
| 2012/0151523 A1* | 6/2012 | Prasad ................. H04N 21/812 |
| | | 725/35 |
| 2012/0200703 A1 | 8/2012 | Nadir et al. |
| 2012/0224694 A1 | 9/2012 | Lu et al. |
| 2012/0230423 A1 | 9/2012 | Esenlik et al. |
| 2012/0287903 A1 | 11/2012 | Alcorn |
| 2012/0320203 A1 | 12/2012 | Liu |
| 2012/0322444 A1 | 12/2012 | Alcorn |
| 2012/0327844 A1 | 12/2012 | Alcorn |
| 2013/0048792 A1 | 2/2013 | Szarek et al. |
| 2013/0050486 A1* | 2/2013 | Omer ..................... H04N 7/185 |
| | | 348/E7.085 |
| 2013/0050487 A1 | 2/2013 | Omer et al. |
| 2013/0051778 A1 | 2/2013 | Dimotakis |
| 2013/0051782 A1 | 2/2013 | Dimotakis |
| 2013/0135471 A1 | 5/2013 | Giuffrida et al. |
| 2013/0142267 A1 | 6/2013 | Esenlik et al. |
| 2013/0250057 A1 | 9/2013 | Choi et al. |
| 2013/0282238 A1* | 10/2013 | Ricci ..................... G06Q 10/00 |
| | | 701/99 |

(56) References Cited

U.S. PATENT DOCUMENTS

| | | | |
|---|---|---|---|
| 2013/0297743 A1 | 11/2013 | Eschet et al. |
| 2014/0133330 A1 | 5/2014 | Chapman |
| 2014/0161435 A1 | 6/2014 | Dimotakis |
| 2014/0192155 A1 | 7/2014 | Choi et al. |
| 2014/0198850 A1 | 7/2014 | Choi et al. |
| 2014/0328413 A1 | 11/2014 | Esenlik et al. |
| 2016/0073086 A1 | 3/2016 | Choi et al. |

FOREIGN PATENT DOCUMENTS

| | | |
|---|---|---|
| TW | 211058 B | 8/1993 |
| TW | 1311121 B | 6/2009 |
| WO | WO-2013074172 A2 | 5/2013 |
| WO | WO-2013074173 A2 | 5/2013 |
| WO | WO-2013074175 A1 | 5/2013 |
| WO | WO-2013074176 A1 | 5/2013 |
| WO | WO-2013074177 A2 | 5/2013 |

OTHER PUBLICATIONS

Notice of Allowance for U.S. Appl. No. 15/010,445, mailed Nov. 4, 2020, 9 pages.
Office Action for U.S. Appl. No. 15/010,445, mailed Jan. 24, 2020, 50 pages.
Office Action for U.S. Appl. No. 15/010,445, mailed Sep. 20, 2017, 37 pages.
Office Action for U.S. Appl. No. 15/010,445, mailed Mar. 11, 2019, 31 pages.
Office Action for U.S. Appl. No. 15/010,445, mailed Oct. 4, 2018, 39 pages.
Office Action for U.S. Appl. No. 15/010,445, mailed Feb. 10, 2017, 25 pages.
Office Action for U.S. Appl. No. 15/010,445, mailed Jun. 10, 2016, 31 pages.
Office Action for U.S. Appl. No. 15/010,445, mailed Sep. 22, 2016, 18 pages.
Notice of Allowance for U.S. Appl. No. 13/220,619, mailed Mar. 6, 2015, 7 pages.
Notice of Allowance for U.S. Appl. No. 13/967,720, mailed Mar. 25, 2015, 7 pages.
Notice of Allowance in U.S. Appl. No. 13/220,562, mailed on May 1, 2013, 8 pages.
Notice of Allowance in U.S. Appl. No. 13/220,617, mailed on Jun. 10, 2013, 9 pages.
Office Action for U.S. Appl. No. 13/220,535, mailed Dec. 2, 2014, 15 pages.
Office Action for U.S. Appl. No. 13/220,535, mailed Feb. 27, 2014, 11 pages.
Office Action for U.S. Appl. No. 13/220,619, mailed May 13, 2014, 11 pages.
Office Action for U.S. Appl. No. 13/220,619, mailed Oct. 8, 2014, 11 pages.
Office Action for U.S. Appl. No. 13/220,535, mailed Aug. 2, 2013, 10 pages.
Office Action for U.S. Appl. No. 13/220,535, mailed Aug. 1, 2014, 11 pages.
Office Action for U.S. Appl. No. 13/967,720, mailed Oct. 8, 2014, 14 pages.
Office Action in U.S. Appl. No. 13/220,562, dated Nov. 23, 2012, 10 pages.
Office Action in U.S. Appl. No. 13/220,617, dated Dec. 4, 2012, 18 pages.
Office Action in U.S. Appl. No. 13/220,197, dated Nov. 7, 2013, 25 pages.
Office Action in U.S. Appl. No. 13/220,197, dated Jun. 2, 2014, 32 pages.
Office Action (Restriction Requirement) for U.S. Appl. No. 13/220,619, mailed Dec. 9, 2013, 8 pages.
PCT International Search Report and Written Opinion in International Application No. PCT/US12/52723, mailed May 2013, 10 pages.
PCT International Search Report and Written Opinion in International Application No. PCT/US12/52725, mailed May 2013, 6 pages.
PCT International Search Report and Written Opinion in International Application No. PCT/US12/52727, mailed Mar. 18, 2013, 9 pages.
PCT International Search Report and Written Opinion in International Application No. PCT/US12/52728, mailed 19, 2013, 14 pages.
PCT International Search Report and Written Opinion in International Application No. PCT/US12/52729, mailed May 2013, 8 pages.
Taiwanese Office Action and Search Report for Taiwanese Application No. 101130827, mailed Aug. 21, 2015, 8 pages.
Taiwanese Office Action and Search Report for Taiwanese Application No. 101130828, mailed Nov. 11, 2014, 24 pages.
Taiwanese Office Action and Search Report for Taiwanese Application No. 101130829, completed May 14, 2014, 17 pages.
Taiwanese Decision of Rejection for Taiwanese Application No. 101130829, mailed Sep. 29, 2014, 7 pages.
Taiwanese Office Action and Search Report for Taiwanese Application No. 101130830, mailed Oct. 30, 2014, 12 pages.
Taiwanese Office Action and Search Report for Taiwanese Application No. 101130832, mailed Jun. 26, 2015, 18 pages.
Taiwanese Office Action and Search Report for Taiwanese Application No. 101130827, mailed Feb. 12, 2015, 17 pages.
Office Action, dated Jun. 21, 2016, issued in Taiwanese Patent Application No. 105113973, 18 pages.

\* cited by examiner

SYSTEM AND METHOD OF HIGH-RESOLUTION DIGITAL DATA IMAGE TRANSMISSION

CROSS REFERENCE TO RELATED APPLICATIONS

The present application is a continuation of U.S. patent application Ser. No. 17/957,212 filed Sep. 30, 2022 and issued Jul. 11, 2023 as U.S. Pat. No. 11,700,408 and entitled "SYSTEM AND METHOD OF HIGH-RESOLUTION DIGITAL DATA IMAGE TRANSMISSION," which is a continuation of U.S. patent application Ser. No. 17/194,028 filed Mar. 5, 2021 and issued Oct. 4, 2022 as U.S. Pat. No. 11,463,760 and entitled "SYSTEM AND METHOD OF HIGH-RESOLUTION DIGITAL DATA IMAGE TRANSMISSION," which is a continuation of U.S. patent application Ser. No. 15/010,445 filed Jan. 29, 2016 and issued Mar. 9, 2021 as U.S. Pat. No. 10,945,017 and entitled "SYSTEM AND METHOD OF HIGH-RESOLUTION DIGITAL DATA IMAGE TRANSMISSION," which is a continuation of U.S. patent application Ser. No. 13/220,197 filed Aug. 29, 2011 and issued Mar. 15, 2016 as U.S. Pat. No. 9,288,513 and entitled "SYSTEM AND METHOD OF HIGH-RESOLUTION DIGITAL DATA IMAGE TRANSMISSION."

TECHNICAL FIELD

The present disclosure relates generally to transmission of both a still image and a video stream and, more particularly, to a system that allows the combination of transmission of a still image while maintaining a video stream from an aircraft to a ground station.

BACKGROUND

The way that the Vietnam War is now remembered as the helicopter war, the current conflicts in Iraq and Afghanistan may be remembered for the use of unmanned drones or unmanned aerial vehicles (UAVs). Drones may facilitate remote intelligence gathering, alleviating the need for foot soldiers to enter into hostile areas "blind," with little or no information about the location and strength of hostile forces. Drones may provide close combat support, such as identifying and eliminating targets of interest, alleviating the need to expose soldiers and/or airmen to potential small arms fire, mortars, rocket grenades, road-side bombs, anti-aircraft weaponry, missiles, and other dangers.

Identification of targets and reconnaissance typically involves analyzing video images acquired from cameras carried by the drones. Such cameras may maintain a real time video feed that tracks targets as they move or change over a long period of time. Since video involves sending multiple still frame images from a camera each second, streaming video requires a great deal of bandwidth. Maintaining such a large bandwidth is a challenge both for aircraft video systems that must process and stream the raw video data and ground stations that have limited bandwidth to receive the video feed. One of the tradeoffs to address these concerns is that video quality is degraded by either lowering the resolution (e.g. number of pixels) and/or reducing the image frame rate in order to decrease the required bandwidth. Thus, a video feed allows a remote operator to follow a target, but it does not provide a high resolution image of the target for detailed analysis.

Thus, there is a need for better image transmission from unmanned aerial vehicles.

BRIEF SUMMARY

Aspects of the present disclosure include a system for transmitting still images and a video feed to a remote location. The system includes an aircraft having a digital video camera to capture still images and video frames of an object. A video encoder is coupled to the camera to provide a video output including video packets. A file server is coupled to the camera to provide a still image output including image data packets. A multiplexer is coupled to the video output and the still image output. The multiplexer produces a data transmission including the video packets and the image data packets. A transmitter sends the data transmission to the remote location.

Another example is a system for receiving a combined data transmission of video stream packets and image data packets associated with a still image sent from an aircraft. The system includes a receiver for receiving a multiplexed data transmission including video stream packets and image data packets. A demultiplexer is coupled to the receiver. The demultiplexer separates the video stream packets and the image data packets. A video decoder is coupled to the demultiplexer to assemble the video packets to produce a video stream. A combiner is coupled to the demultiplexer to combine the image data packets to form a still image.

Another example is a method of transmitting a still image in a video data transmission. A still image is captured via a camera. A video stream is captured via the camera. The still image is converted into a plurality of image data packets. The video stream is converted into a plurality of video image packets. The image data packets and video image packets are combined into a data transmission. The combined transmission is sent to a remote receiver. The combined transmission is received on a remote receiver. The combined transmission is demultiplexed into the plurality of image data packets and video image packets. The video image packets are decoded into a video stream. The image data packets are combined into the digital image.

Another example is a system for transmitting data in a first format and data in a second format to a remote location. The system includes an aircraft having a first sensor to capture data in a first format and a second sensor to capture data in a second data format. A multiplexer is coupled to the first and second sensors. The multiplexer produces a data transmission including the packets of data in the first format and the packets of data in the second format. A transmitter sends the data transmission to the remote location.

The foregoing and additional aspects and implementations of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

Figure 1:
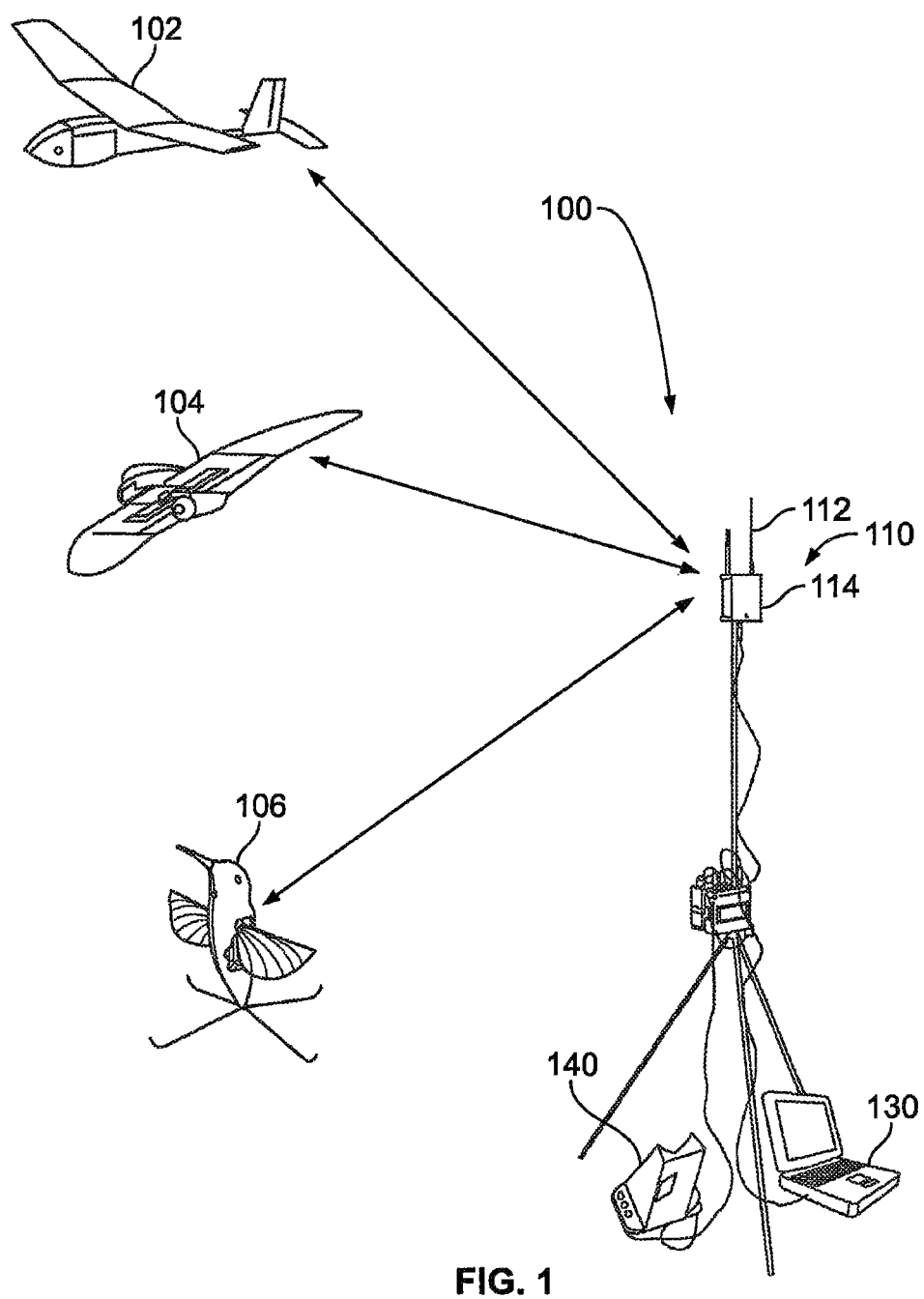
FIG. 1 is a diagram of an example aerial surveillance system including drone aircraft and a ground control station.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1 is a diagram of an aerial surveillance system 100 including drone aircraft 102, 104, and 106 and a mobile ground control station 110. The ground control station 110 allocates bandwidth on a single channel to each of the aircraft 102, 104, and 106 for sending surveillance data to the ground control station 110. In this example, the ground control station 110 may manually control one of the aircraft 102, 104, or 106. The other aircraft 102, 104, and 106 may be programmed in an automatic flight mode to navigate to certain waypoints, hover, and or complete automated stored flight patterns that do not require human operator control.

Each of the aircraft 102, 104, and 106 in FIG. 1 include various systems including a structural control system and a flight control system. Both the structural control system and the flight control system receive data from numerous sources. One such source is a communications unit configured to receive instructions from a ground controller (e.g., a ground-based pilot) operating the ground control station 110. Another source is a plurality of flight parameter sensors, preferably including one or more of the following sensors: a positional sensor (e.g., a GPS), a heading sensor, a pitch sensor, a roll sensor, a yaw sensor, an altimeter, a flight speed sensor, a vertical speed sensor, a slip sensor, a pitch rate sensor, a roll rate sensor, and a yaw rate sensor. A third source is a plurality of structural sensors, preferably including one or more of the following sensors: vertical wing bending sensors, fore-and-aft wing bending sensors, wing torsion sensors, motor speed and/or thrust sensors, control surface deflection and/or force sensors, and solar sensors configured to detect the exposure of the structure to sunlight. Each of these sensors is of a type either known in the art (e.g., strain gauges and positional sensors), or that can be formed with a combination of known sensors.

Figure 2:
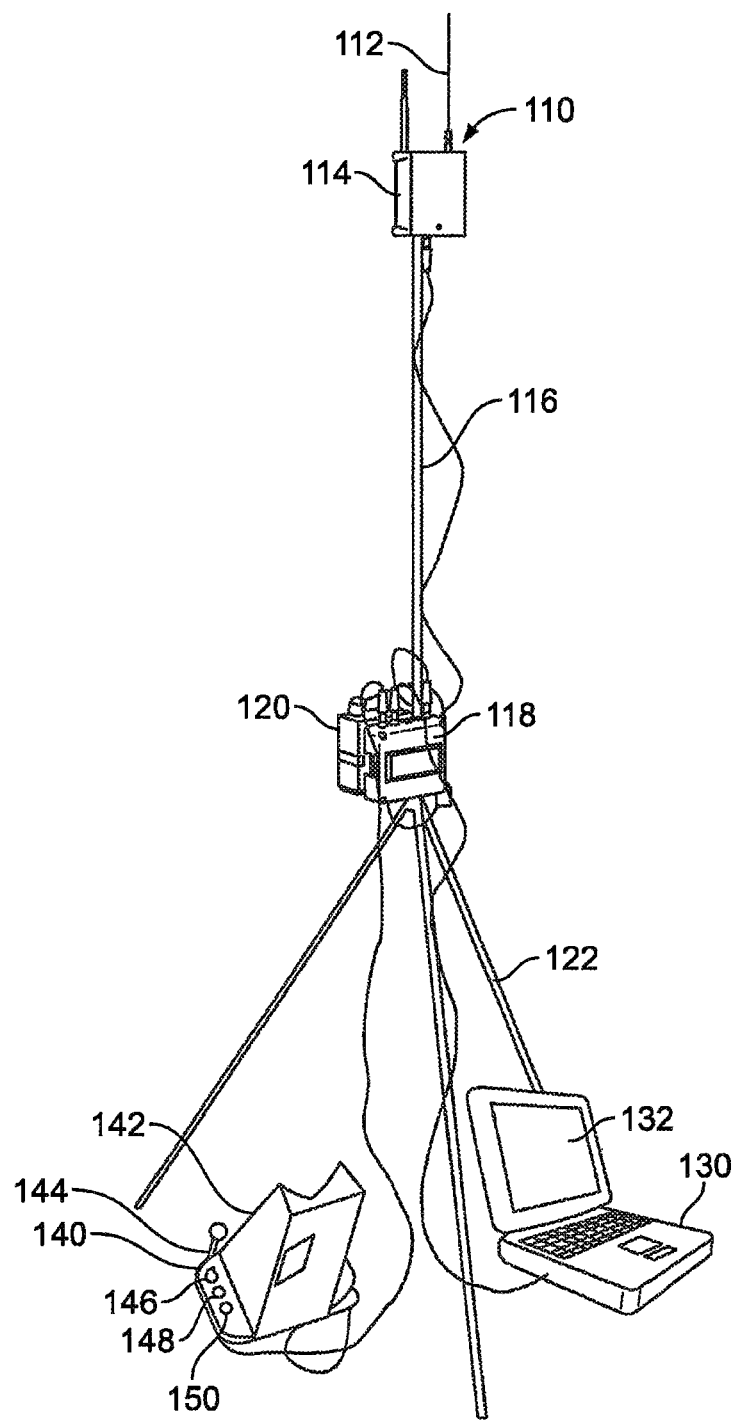
FIG. 2 is a perspective diagram of the example ground control station in FIG. 1.

FIG. 2 is a perspective view of the mobile ground control station 110 in FIG. 1. The mobile ground control station 110 may be used to manually pilot the aircraft such as the aircraft 102 in the field and provide the data output from multiple aircraft. The ground control station 110 includes an antenna 112, a transceiver 114, a mast 116, a hub 118, a battery 120, and a mounting tripod 122. The hub 118 provides connection interfaces for connecting cables from the transceiver 114 on the mast 116. The transceiver 114 receives and transmits signals via the antenna 112. In this example, the transceiver has a digital decoder that takes a video feed from the aircraft 102 and converts it to an analog video feed. The transceiver also outputs a raw data transmission signal that may include both still image data and streaming video data as will be detailed below.

In this example, the hub 118 includes a memory device for storing still images acquired from the aircraft 102 as well as mission data for programming flights for the aircraft 102. The hub 118 also provides a connector interface for cables coupled to a portable computer 130 and a hand controller 140. The hand controller 140 receives the analog video feed from the transceiver 114 with the hub 118. Of course digital video data may also be sent to the hand controller 140 from the transceiver 114. As will be explained below, the portable computer 130 includes a display 132 and includes stored machine instructions to process both video and still images from the aircraft 102, 104, and 106 via the signals received by the transceiver 114 and display the video or still images on the display 132.

The hand controller 140 includes a display 142 that displays video from the aircraft for purposes of piloting the aircraft or showing real-time video when the aircraft 102 is in automatic flight mode. The hand controller 140 includes a joystick 144 that may be used to control the aircraft or the positioning of a camera on board the aircraft to acquire video or still images. The hand controller 140 includes a throttle switch 146 that controls the altitude of the aircraft, a multi-function switch 148, and an enter key 150 to assist in controlling the aircraft 102 in the manual piloting mode.

Figure 3:
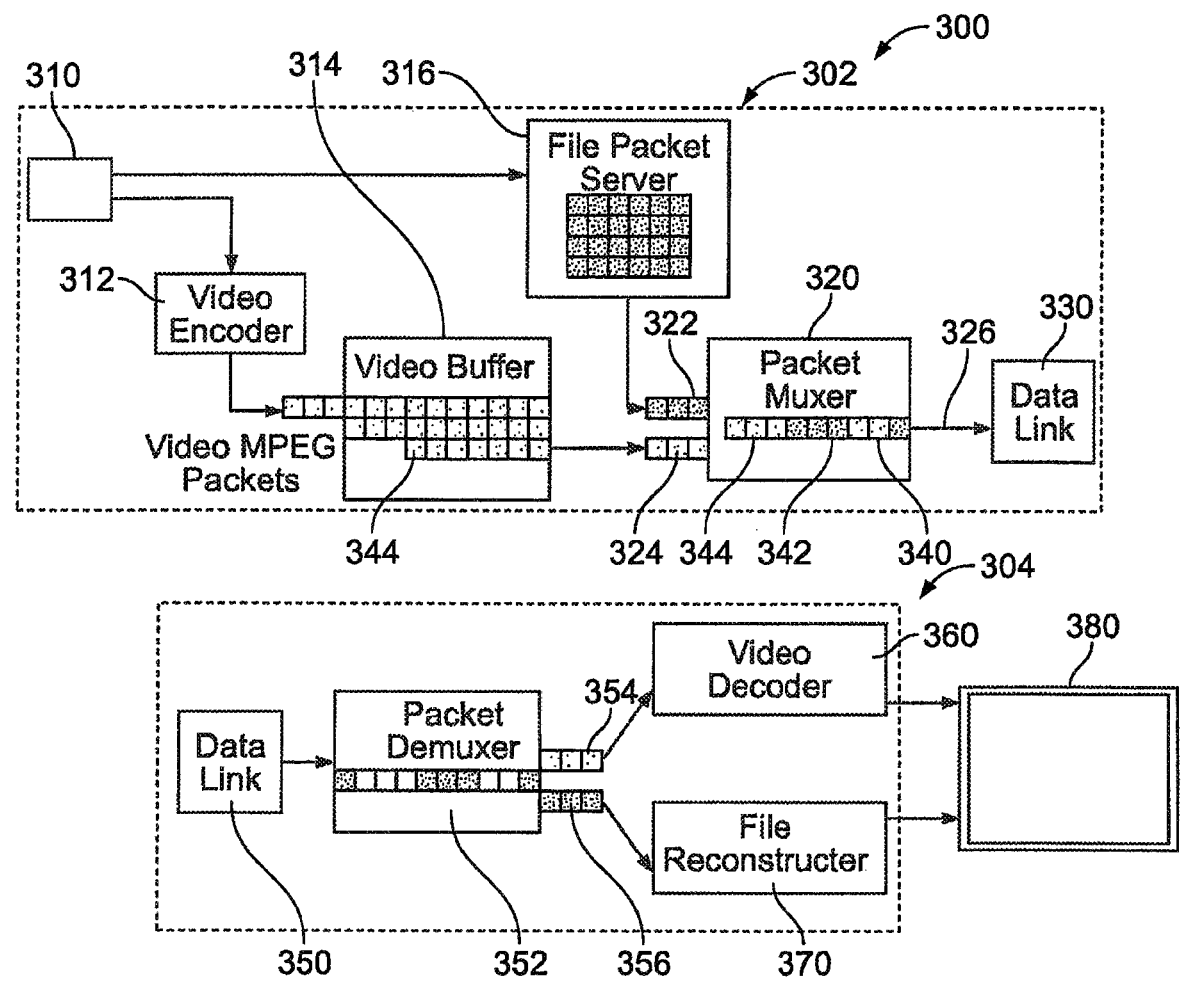
FIG. 3 is diagram of the aerial imaging system and ground control system used to provide a combined video and file image data transmission from the aircraft in FIG. 1.

FIG. 3 is a block diagram of a video and still image transmission system 300 between the aircraft such as the aircraft 102 and the ground control station 110 in FIG. 1. The image transmission system 300 includes an on-board video image system 302 and a ground processing system 304. The on-board video image system 302 includes a CMOS camera 310 that is mounted on the exterior of the aircraft 102 to capture either video or still images from the ground. In the example aircraft 102, the camera 310 is mounted in a rotating turret that permits the camera to be pointed at areas on the ground under the aircraft 102. The CMOS camera 310 in this example may produce both still images such as a still image at a resolution of 5 megapixels and video images, which are at lower resolution because of the numerous images that comprise a real-time video stream. An example of the camera 310 is a 5 megapixel color imager with both video and still image output. In this example, the camera 310 provides a video stream at a maximum 30 frames per second, although a lower frame rate may be used. Of course, those of skill in the art understand that higher resolution cameras that capture video at greater maximum frame rates may be used.

In video mode, the camera 310 converts captured images to raw digital data frames that are output to a video encoder 312. The video encoder 312 is coupled to a video buffer 314. The camera 310 captures still images at a higher resolution, which are sent to a file packet server 316. The file packet server 316 divides the captured still image pixel data into data blocks since a desired image resolution requires relatively larger amounts of image data. In this example, the video encoder 312 is an ASIC coupled to the output of the camera 310. The on-board image system 302 includes a packet multiplexer 320. The packet multiplexer 320 has an image file input 322, a video stream input 324 and a multiplexed output 326. The input 322 is coupled to the file packet server 316 and the video stream input 324 is coupled to the video encoder 312 and the video buffer 314. In this example, an FPGA is configured as the video buffer 314, the file packet server 316, and the multiplexer 320. Of course other hardware such as ASICs or general processors or DSPs may be used instead of the FPGA. Each of the separate components 314, 316, and 320 may be on a separate chip or any combination may be on the same chip.

The multiplexed output 326 of the multiplexer 320 is coupled to a data link 330, which may be a receiver/transceiver in communication with the ground control station 110 in FIG. 1. One example of the data link 330 is described in U.S. Publication No. 20110065469 hereby incorporated by reference. The transmissions from the data link 330 may be allocated a certain amount of bandwidth in the broadcast channel to the aircraft 102 when the ground control station 110 is controlling multiple aircraft. In the case where only one aircraft is controlled by the ground control station 110, the entire bandwidth of the broadcast channel is allocated to the data link 330. The data link 330 sends a multiplexed data transmission 340 from the aircraft 102 to the ground control station 110 in the available bandwidth allocated to the aircraft 102. As shown in FIG. 3, the multiplexed data transmission 340 includes still image file blocks or packets 342 assembled from the file packet server 316 and taken from the image file input 322 and video packets, or blocks 344 assembled from the video buffer 314 and taken from the video input 324.

The ground processing system 304 includes a data link 350, which is coupled to a packet demultiplexer 352. In this example, the data link 350 is a receiver/transmitter device such as the transceiver 114 in FIG. 2 in communication with the data link 330 on board the aircraft 102. The packet demultiplexer 352 has a video output 354 and a still file output 356. The video output 354 is coupled to a video decoder 360, which assembles the video packets into a stream of video images that may be displayed on a display 380 to create a video stream. The display 380 may be the display 142 on the hand controller 140 or the display 132 on the portable computer 130 or another display. The still file output 356 is coupled to a file reconstructer 370, which reassembles the received blocks into a still image that may be displayed on the display 380. As shown in FIG. 3, the multiplexed data transmission 340, including both video packets 342 and file packets 340, is separated into video and file packets by the packet demultiplexer 352. These components are software modules stored and executed by the processor in the portable computer 130 in FIG. 1. However, such functions could be performed by a dedicated DSP, controller, FPGA, etc.

Figure 4:
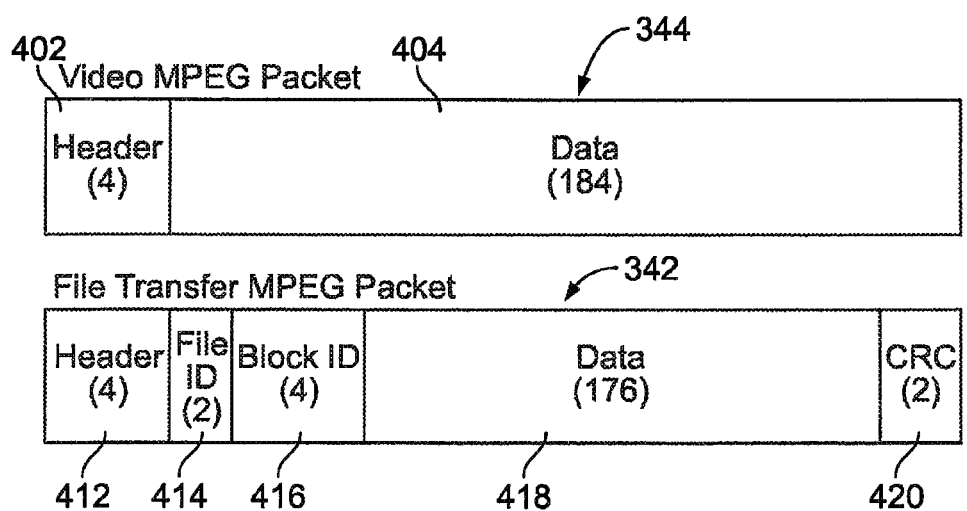
FIG. 4 is a diagram of the video and file image packets combined in a data transmission from the aircraft in FIG. 1.

FIG. 4 is a diagram of a video packet such as the video packets 344 and a file transfer packet such as the still image file packet 342 in the data transmission 340 in FIG. 3. In this example, each of the packets 342 or 344 is 188 bytes of data, which are serialized in the transmission channel to the ground processing system 304. The video packets 344 include data for the video stream from the video buffer 314 in FIG. 3 while the file transfer packets 342 include blocks of a still image received by the file packet server 316. The video packet 344 in this example is formed from the MPEG 2 standard for video streaming. The video packet 344 includes a header field 402 that is 4 bytes that identifies the frame as an MPEG 2 type frame. The video packet 344 also includes a video data field 404 that is 184 bytes in length. In this example, the MPEG 2 video stream is used for the frame standard and each block has a unique number in the header field 402, e.g., a "34" is all video, a "24" is audio to identify the data type.

The file transfer packet 342 includes a header field 412, a file ID field 414, a block ID field 416, a data field 418, and a CRC field 420. In this example, the header field 412 is 4 bytes and is indicative of the location of the block within the overall image. The block ID field 416 is 2 bytes and identifies the particular file or separate image that the block belongs to. The data field 418 is 176 bytes and includes image data for the block. The CRC field 420 is 2 bytes long and used as a checksum to validate the data.

The present system allows the transmission of high resolution still images during the transmission of a video stream without having to interrupt the video stream to wait for the download of a still image. As explained above, the system 300 takes data packets from both a video stream and a still image and combines them into a multiplexed data transmission 340 to the ground control station 110.

In operation, the camera 310 in the aircraft 102 will always send a video feed to the ground control station 110. A user may send commands via the transceiver 114 to the aircraft 102 to take a still image or images from the camera 310 in FIG. 3. The still image produces a large data file due to the higher resolution that may be received while still broadcasting the video stream from the video encoder 312. The aircraft on-board image processing system 302 allows sharing the bandwidth of the transmission to the ground control station 110 between the still image or images and the video feed. The combined transmission therefore downscales the video stream feed by decreasing either or both the resolution and frame rate and intersperses the image file packets in the transmission. The packet demultiplexer 352 of the ground processing system 304 only looks for blocks marked as video for the video decoder 360. The file reconstructer 360 grabs the PID field 416 as part of the file that identifies the block number and reassembles the image by arranging the blocks according to the data in the header field 412. The reconstructer 370 keeps a log of the received blocks to allow for retransmission of missing blocks from the still image or images and provide a status of the download of the still image or still images.

A user may decide how much of the bandwidth to share between the video stream and the acquired still image. If the image is a priority, the user may prioritize file packets and the multiplexer 320 may be then controlled to accept more packets from the file packet server 316 in order to send the image at a faster rate. The user may also control the multiplexer 320 to send less file image packets and more equitably share the transmission bandwidth between downloading the image and transmitting the video stream if the image reception is not of as high importance. One example of a control of the ratio of video to image packet is a slider control interface that is between zero percent video frames and 100 percent video frames, but other controls may be used. In this example, the ground control station 110 will continue to command minimal sending of video frames at the lowest resolution and the lowest frame rate at zero percent in order to maintain imagery coming from the aircraft which can aid in the control of the aircraft 102 and a situational awareness of the real-time activities occurring on the ground. Other examples allow the video transmission to be stopped in order to maximize the transmission rate of the still images. In other examples the ground controller 110 can also adjust the resolution of the still images to increase the transmission rate of the images and/or to reduce the effect on the video transmission (e.g. minimize the reduction in either the frame rate or the resolution of the video). Also, it should be noted that the ground controller 110 may control either or both of the video frame rate and the video resolution.

Figure 5A:
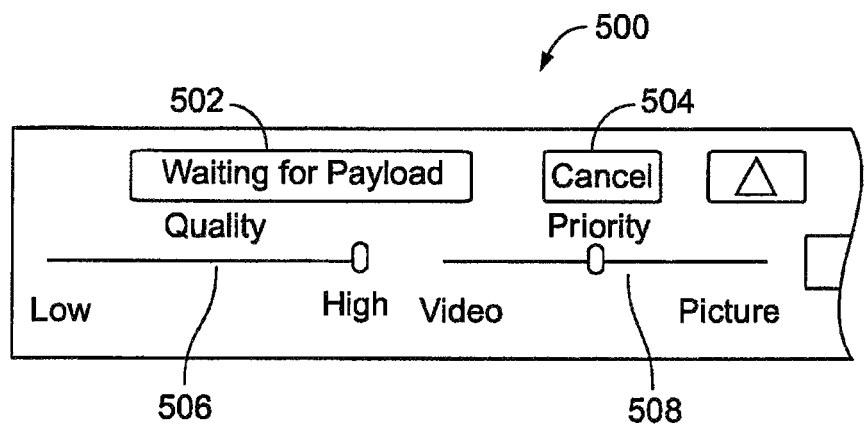
FIG. 5A is a screen image of a control panel for controlling the ratio of transmission of the video and file image packets.

FIG. 5A is a view of an image of a control panel graphic 500 that may be displayed on the display 142 of the ground controller 110 in FIG. 2. The control panel graphic 500 includes a status field 502, a cancel button 504, a quality slider control 506 and a priority slide control 508. The status field 502 displays text that indicates the status of data transferred by aircraft controlled by the ground controller 110. The cancel button 504 allows a user to cancel the transfer of data from the aircraft.

The quality slide control 506 allows the user to move the slide between low quality and high quality for the captured image. The high quality sets the resolution size of the image to the maximum number of pixels in each direction and the lowest amount of compression. The low quality setting sets the resolution size to a low number of pixels and increases compression to the maximum. The priority slide control 508 varies between video and picture. When the slide control of the priority slide control 508 is set at the video setting, transmission of video packets is given priority while when the slide control is set at the picture setting, the data image packets are given priority.

Figure 5B:
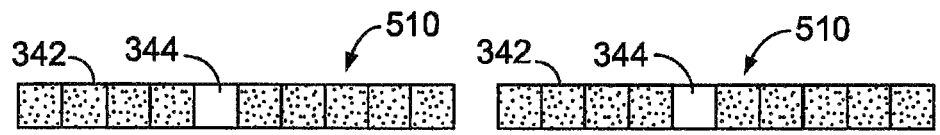
FIGS. 5B-5D are diagrams of video and file image data packets with different ratios of transmission.

FIG. 5B is a diagram of an example of the data transmission to the ground controller 110 where the priority slide control 508 is set for a greater priority of transmission of the image (picture). In the example shown in FIG. 5B, a much greater number of still image packets 342 are included in a transmission 510 than video packets 344.

Figure 5C:
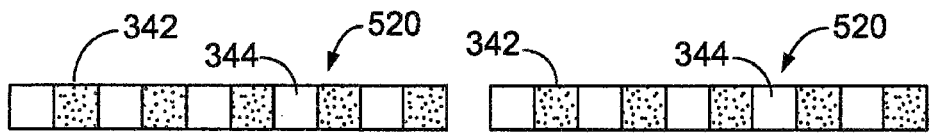

FIG. 5C is a diagram of an example of the data transmission to the ground controller 110 where the priority slide control 508 is set for roughly the same priority of transmission of the image and the video. In the example shown in FIG. 5C, a roughly equal number of still image packets 342 are included in a transmission 520 as video packets 344.

Figure 5D:

FIG. 5D is a diagram of an example of the data transmission to the ground controller 110 where the priority slide control 508 is set for a greater priority of transmission of the video. In the example shown in FIG. 5D, a much greater number of video packets 344 are included in a transmission 530 than still image packets 342.

The ground station 110 may set up a system of retries. As explained above, each still image file is broken into N 182 byte blocks or packets in this example. In the instance where the aircraft processing system 302 reports that it has a file of N blocks to ground, the ground control station 110 may prioritize the file solely and halt sending video packets until all of the blocks of the still image are received.

The ground control station 110 may also allow an operator to dynamically allocate bandwidth of the broadcast channel among multiple aircraft. The ground control station 110 may include an arbiter device that decides which aircraft is allocated bandwidth based on predetermined factors such as maximum payload data output. Alternatively, priority may be determined by the operator to allocate bandwidth. Such allocation controls are further described in U.S. Publication No. 20110065469.

The components noted in FIG. 3 may be conveniently implemented using one or more general purpose computer systems, microprocessors, digital signal processors, microcontrollers, application specific integrated circuits (ASIC), programmable logic devices (PLO), field programmable logic devices (FPLD), field programmable gate arrays (FPGA), and the like, programmed according to the teachings as described and illustrated herein, as will be appreciated by those skilled in the computer, software, and networking arts.

In addition, two or more computing systems or devices may be substituted for any one of the controllers described herein. Accordingly, principles and advantages of distributed processing, such as redundancy, replication, and the like, also can be implemented, as desired, to increase the robustness and performance of controllers described herein. The controllers may also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

Although the aircraft 102 in this example has a camera such as the CMOS camera 310, the aircraft 102 may include other types of payloads such as radiation detectors, radar, lidar, air samplers, etc. These sensors all have different types of data that may be transmitted back to the ground to a ground control station such as the ground control station 110. Accordingly, such data may also be combined with either still image or video images in the transmission to the ground control station 110 according to the examples described above. The ground control station 110 may accept transmission of data in a first format and data in a second format in a multiplexed data transmission. The aircraft such as the aircraft 102 includes a first sensor to capture data in a first format and a second sensor to capture data in a second data format. The sensors may include diverse sensors such as the cameras, radiation detectors, radar, lidar, etc. A multiplexer is coupled to the first and second sensors and produces a data transmission including the packets of data in the first format and the packets of data in the second format. A transmitter on board the aircraft 102 sends the data transmission to the remote location such as the ground control station 110. The ground control station 110 may control the transmission ratio between the data in the first data format or the second data format depending on the desired priority.

Figure 6:
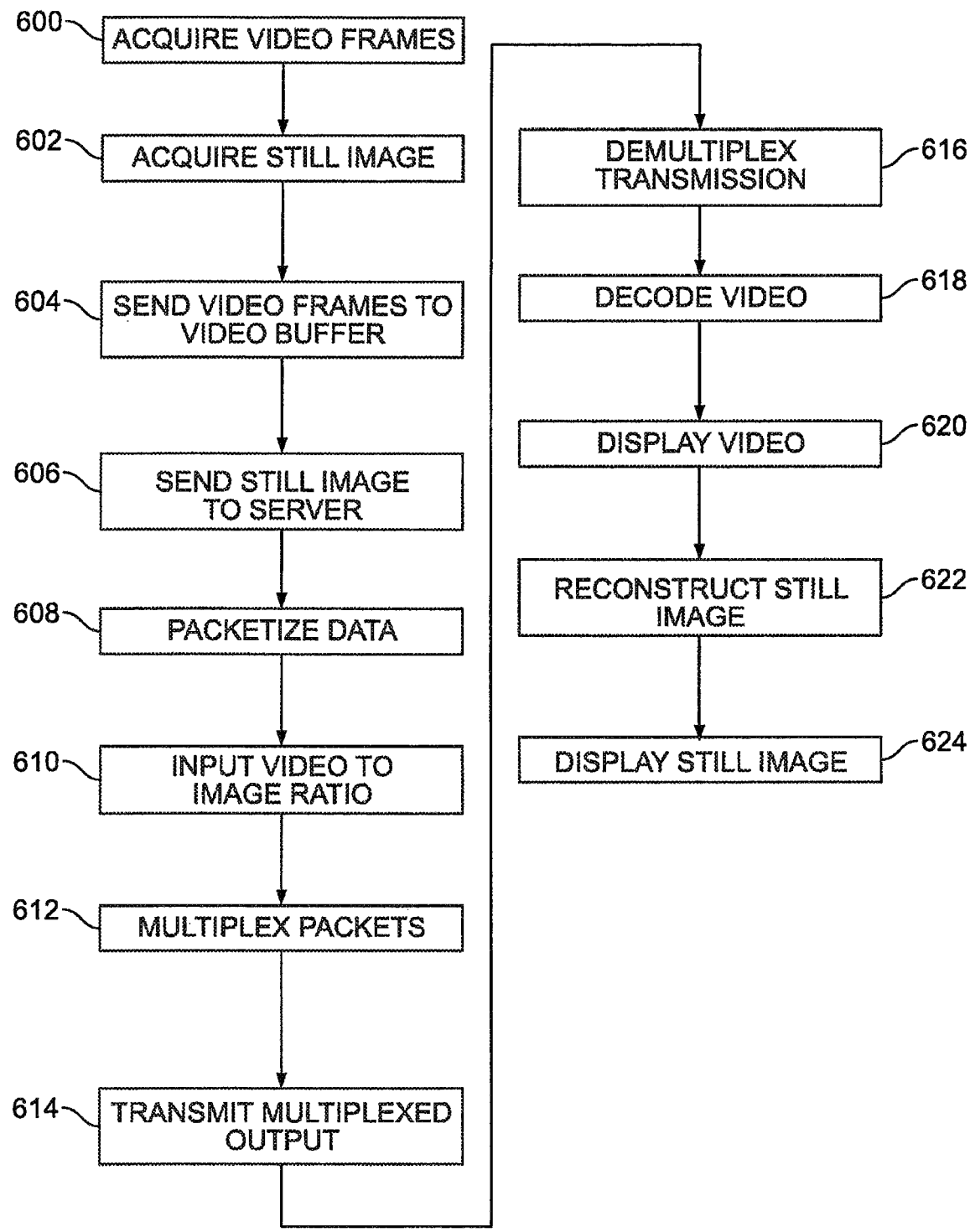
FIG. 6 is a flow diagram of the process of transmitting a data stream of video frame and still image packets.

The operation of the example image and video combination sequence will now be described with reference to FIGS. 1-4 in conjunction with the flow diagram shown in FIG. 6. The flow diagram in FIG. 6 is representative of example machine readable instructions for transmission and reception of combined video and still images. In this example, the machine readable instructions comprise an algorithm for execution by: (a) a processor, (b) a controller, and/or (c) one or more other suitable processing device(s). The algorithm may be embodied in software stored on tangible and non-transitory media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the transmission and reception of combined video and still images could be implemented by software, hardware, and/or firmware. Also, some or all of the machine readable instructions represented by the flowchart of FIG. 5 may be implemented manually. Further, although the example algorithm is described with reference to the flowchart illustrated in FIG. 6, persons of ordinary skill in the art will readily appreciate that many other methods of implementing the example machine readable instructions may alternatively be used. For example, the order of execution of the blocks may be changed, and/or some of the blocks described may be changed, eliminated, or combined.

FIG. 6 is a flow diagram of the process of capturing and combining still image data and a video stream. The video camera 310 first acquires a stream of images based on the frame rate for the capturing of a video stream input (600). On receiving a command from the ground control station 110, the video camera 310 captures a still image at a higher resolution (602). The captured video stream images are sent to the video encoder 312 and video buffer 314 (604). The captured still image is sent to the image server (606). The respective image data is packetized according to the respective formats (608). In this example, the video stream is converted into packets according to MPEG 2 video stream standards while the image data is divided into blocks and assigned headers for the image and the specific block ID for each image.

The video ratio is then input from the ground control station 110 such as via the controls on the control panel shown in FIG. 5A (610). As explained above, the ground control station 110 allows a user to select the amount of either the video stream images or the still image to be transmitted. The video and image data file packets are then multiplexed based on inputs from the video buffer 314 and the file packet server 316 according to the ratio received (612). The multiplexed data packets are then transmitted to the ground control station 110 (614). The received multiplexed data transmission is then demultiplexed by the demultiplexer 352 to create outputs of video packets and still image packets (616). The video packets are streamed to the decoder 360 to be assembled in a video stream (618). The video stream output from the decoder 360 is then input to a display such as the display 380 to display the video (620). The image file packets are assembled by the file reconstructer 370 into the still image (622). The still image may also be sent to the display for presentation to the user (624).

While particular implementations and applications of the present disclosure have been illustrated, and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A system for decoding multi-format data, the system comprising:
a demultiplexer configured to receive a multiplexed transmission and output first packets of data of a first format and second packets of data of a second format, the multiplexed transmission being associated with an allocated bandwidth, the multiplexed transmission including the first packets of data captured as a stream of data multiplexed with the second packets of data according to a ratio;
a decoder coupled to the demultiplexer to receive the first packets of data and assemble the first packets of data into an assembled stream of data, wherein the ratio is based on the allocated bandwidth such that the second packets of data are multiplexed into the multiplexed transmission without interrupting the assembled stream of data; and
a file reconstructor coupled to the demultiplexer to receive and reconstruct the second packets of data.

2. The system of claim 1, wherein the first format is a video format, and wherein the stream of data is a video stream.

3. The system of claim 2, wherein the second format is a still image format.

4. The system of claim 3, wherein the decoder is a video decoder for assembling video packets into an assembled video stream, and wherein the file reconstructer is a still image reconstructer for assembling packets of a still image into a still image.

5. The system of claim 3, wherein the file reconstructor reconstructs the second packets of data into a plurality of still images, wherein each of the second packets of data include an identifier field identifying one of the plurality of still images associated with the respective packet.

6. The system of claim 1, wherein at least one of the first format and the second format is associated with a sensor selected from the group consisting of a radiation detector, a RADAR sensor, a LIDAR sensor, and an air sampler.

7. The system of claim 1, further comprising an input device to set, in response to receiving user input, the allocated bandwidth.

8. The system of claim 1, further comprising an input device to initiate, in response to receiving user input, capture of data in the second format at the remote location.

9. The system of claim 1, further comprising an input device to control, in response to receiving user input, one or both of a resolution and a frame rate associated with one or both of the first packets of data in the first format and the second packets of data in the second format.

10. The system of claim 1, further comprising an input device to adjust, in response to receiving user input, a priority associated with the first packets of data in the first format with respect to the second packets of data in the second format, wherein the ratio is based on the priority.

11. A method for decoding multi-format data, the method comprising:
demultiplexing a multiplexed transmission into first packets of data if a first format and second packets of data of a second format, the multiplexed transmission being associated with an allocated bandwidth, the multiplexed transmission including the first packets of data captured as a stream of data multiplexed with the second packets of data according to a ratio;
decoding the first packets of data to assemble an assembled stream of data, wherein the ratio is based on the allocated bandwidth such that the second packets of data are multiplexed into the multiplexed transmission without interrupting the assembled stream of data; and
reconstructing the second packets of data.

12. The method of claim 11, wherein the first format is a video format, and wherein the stream of data is a video stream.

13. The method of claim 12, wherein the second format is a still image format.

14. The method of claim 13, wherein the decoder is a video decoder for assembling video packets into an assembled video stream, and wherein the file reconstructer is a still image reconstructer for assembling packets of a still image into a still image.

15. The method of claim 13, wherein the file reconstructor reconstructs the second packets of data into a plurality of still images, wherein each of the second packets of data include an identifier field identifying one of the plurality of still images associated with the respective packet.

16. The method of claim 11, wherein at least one of the first format and the second format is associated with a sensor selected from the group consisting of a radiation detector, a RADAR sensor, a LIDAR sensor, and an air sampler.

17. The method of claim 11, further comprising setting, in response to receiving user input from an input device, the allocated bandwidth.

18. The method of claim 11, further comprising initiating, in response to receiving user input from an input device, capture of data in the second format.

19. The method of claim 11, further comprising controlling, in response to receiving user input from an input device, one or both of a resolution and a frame rate associated with one or both of the first packets of data in the first format and the second packets of data in the second format.

20. The method of claim 11, further comprising adjusting, in response to receiving user input from an input device, a priority associated with the first packets of data in the first format with respect to the second packets of data in the second format, wherein the ratio is based on the priority.

* * * * *